United States Patent [19]

Glaab et al.

[11] Patent Number: 5,257,124
[45] Date of Patent: Oct. 26, 1993

[54] LOW DISTORTION LASER SYSTEM FOR AM FIBER OPTIC COMMUNICATION

[75] Inventors: Joseph B. Glaab, New Hope; David R. Huber, Warrington, both of Pa.

[73] Assignee: General Instrument Corporation, Hatboro, Pa.

[21] Appl. No.: 745,539

[22] Filed: Aug. 15, 1991

[51] Int. Cl.⁵ .............................................. H04J 14/00
[52] U.S. Cl. .................................. 359/124; 359/154; 359/132
[58] Field of Search ............... 359/124, 132, 133, 154, 359/157, 173, 181, 188, 195, 114, 161; 358/86

[56] References Cited

U.S. PATENT DOCUMENTS

| 4,393,518 | 7/1983 | Briley | 359/161 |
| 5,126,871 | 6/1992 | Jeffers | 359/154 |

FOREIGN PATENT DOCUMENTS

| 2524229 | 9/1983 | France . | |
| 2537364 | 6/1984 | France | 359/114 |
| 0019544 | 9/1981 | Japan | 359/124 |
| 0181245 | 11/1982 | Japan | 359/114 |
| 127828 | 7/1989 | Japan . | |
| 1-220533 | 9/1989 | Japan . | |

OTHER PUBLICATIONS

M. Makiuchi, et al., "High-Speed Monolithic GaInAs Twin-pin Photodiode for Balanced Optical Coherent Receivers," *Electronics Letters*, 17 Aug. 1989, vol. 25, No. 17, pp. 1144–1145.

*Primary Examiner*—Edward L. Coles, Sr.
*Assistant Examiner*—Kinfe-Michael Negash
*Attorney, Agent, or Firm*—Barry R. Lipsitz

[57] ABSTRACT

An information signal modulates a first optical carrier. The information signal is inverted to modulate a second optical carrier. The modulated first and second optical carriers are multiplexed into a single optical signal for communication over an optical fiber path. At a receiver, the optical signal is demultiplexed to recover the information signal and the inverted information signal. The recovered signals are combined to provide the information signal in the electrical domain with reduced distortion. A dual-detector balanced optical diode pair can be used to combine the recovered information and inverted information signals and provide an analog RF output. The apparatus is particularly suitable for the transmission of AM-VSB television signals.

17 Claims, 2 Drawing Sheets

LOW DISTORTION LASER SYSTEM FOR AM FIBER OPTIC COMMUNICATION

BACKGROUND OF THE INVENTION

The present invention relates to analog optical transmission systems, and more particularly to an apparatus for canceling distortion components introduced by a laser transmitter.

Optical transmission systems are currently being implemented for use in various communication applications. For example, telephone systems are now in use that utilize fiber optic technology to transmit voice and data signals over long distances. Similarly, cable television networks are now available wherein fiber optic technology is used for the transmission of both analog and digital signals.

Prior to the implementation of optical transmission networks, cable television programs were carried as radio frequency (RF) signals over electrical coaxial cables. In fiber optic transmission systems, communication lasers are used for the transmission of the multichannel television signals. The RF signals are used to modulate a light source, and the modulated light is transmitted along the length of an optical fiber.

Optical transmission systems provide substantial benefits, including a virtually unlimited bandwidth and improved system performance. However, harmonic distortion is a major limitation in analog amplitude modulated optical communication transmission systems. Such distortion, and particularly second order distortion, is introduced by the laser which transmits signals over the optical communication system.

U.S. Pat. No. 4,393,518 issued on Jul. 12, 1983 for "Optical Communication Arrangement" discloses an optical transmission system wherein a transmitter transmits an electrical analog input signal as two separate optical signals through a pair of optical fibers to a receiver. One of the optical signals represents the positive portions of the input signal. The other represents the negative portions of the input signal. By combining the two optical signals at the receiver, an electrical analog output signal is generated representative of the input signal, absent even harmonic frequency components that may have been introduced during transmission. The receiver requires various amplifiers including a difference amplifier in order to reconstitute the input signal.

Commonly assigned, copending U.S. patent application Ser. No. 07/436,614 entitled "Distortion Canceling Fiber Optic Transmission System" discloses a scheme in which an analog input signal is communicated to a receiver over one fiber and the inverse of the input signal is communicated to the receiver via a separate, parallel fiber. At the receiver, the signals are combined to cancel harmonic distortion introduced during the signal transmission. Since the entire input signal is transmitted over both of the parallel fibers, the information transmitted can be recovered, albeit at a reduced quality, if one of the fibers breaks.

Both of the aforementioned distortion cancellation schemes have drawbacks. For example, the use of parallel fibers is required, which results in increased expense in the construction of the distribution network. In addition, the design of the receiver is somewhat complex and relatively expensive to implement.

It would be advantageous to provide an improved system for reducing distortion in a fiber optic system that carries analog signals, such as amplitude modulated vestigial sideband (AM-VSB) television signals. The present invention provides such apparatus.

SUMMARY OF THE INVENTION

In accordance with the present invention, apparatus is provided for communicating analog signals over an optical fiber transmission path. Means, such as a semiconductor laser, are provided for producing a first optical carrier. The first optical carrier is modulated with an information signal, such as an analog AM signal. Means are provided for inverting the phase of the information signal, and for modulating a second optical carrier with the inverted information signal. Like the first optical carrier, the second optical carrier can be produced by a semiconductor laser. Means are provided to multiplex the carriers into a single optical signal for communication over an optical fiber path.

A receiver is provided including means coupled to a remote end of the optical fiber path for demultiplexing the optical signal to recover the information signal and the inverted information signal. The recovered signals are combined to provide the information signal in the electrical domain with reduced distortion. In a preferred embodiment, the combining means comprise a dual-detector balanced optical diode pair. In an alternate embodiment, the combining means comprise a first optical detector coupled to receive the recovered information signal and output a corresponding electrical signal, a second optical detector coupled to receive the recovered inverted information signal and output a corresponding electrical signal, and a transformer coupled to receive and combine the electrical outputs from the first and second optical detectors.

The multiplexer means used at the transmitter can comprise a wavelength division multiplexer. The demultiplexer means can comprise a wavelength division multiplexer operated in a reverse direction to provide a wavelength division demultiplexer. The multiplexing and demultiplexing of the modulated first and second optical carriers is facilitated by slightly spacing the wavelengths of the laser transmitters from each other.

DETAILED DESCRIPTION OF THE INVENTION

Figure 1:
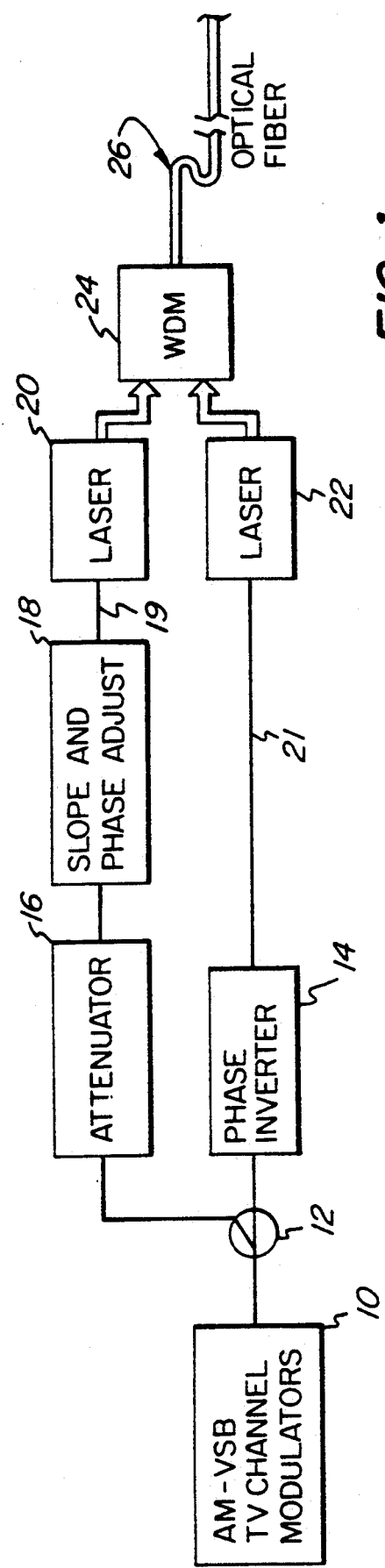
FIG. 1 is a block diagram of transmitter apparatus in accordance with the present invention, in which electrical signal paths are illustrated by single lines and optical signal paths are illustrated by double lines.

FIG. 1 illustrates a transmitter in accordance with the present invention. A plurality of AM-VSB television signals is provided by conventional RF modulators 10 and input to an RF signal splitter 12. Signal splitter 12 provides two paths for the RF signal. In a first path, the signal is inverted by a phase inverter 14 and output on a line 21 for use in modulating an optical carrier generator such as a semiconductor laser 22. Laser 22 outputs an optical carrier at a predetermined wavelength, such as 1.5 microns. By modulating the laser output with the RF signal from phase inverter 14, the inverted input signal can be communicated over an optical fiber. Either direct or external modulation of the optical carrier generator can be used, as well known in the art.

In the second RF path provided by splitter 12, the amplitude of the input signal is attenuated as necessary in an attenuator 16, and adjusted in a conventional RF slope and phase adjusting circuit 18 so that an RF modulation signal output on line 19 matches the phase inverted modulation signal output on line 21 in amplitude, slope and phase. The only difference between the signals on lines 19 and 21 is that the signal on line 21 is 180° out of phase with the signal on line 19.

The adjusted RF signal on line 19 is coupled to the modulating input of a semiconductor laser 20 so that it can be carried on an optical carrier produced by laser 20. In a preferred embodiment, the wavelength of laser 20 is slightly offset from the wavelength of laser 22 (e.g., by approximately 2-5 nanometers) to prevent RF beats and allow the respective carriers output from lasers 20, 22 to be multiplexed and demultiplexed using conventional wavelength division multiplexing/demultiplexing techniques.

In the embodiment illustrated in FIG. 1, the modulated carriers output from lasers 20, 22 are input to a conventional wavelength division multiplexer (WDM) 24. WDM 24 combines the modulated carriers for output as a single optical signal on an optical fiber 26. One or more optical amplifiers (not shown), such as Erbium fiber amplifiers, can be provided along fiber 26 to maintain the signal strength over long distances.

Figure 2:
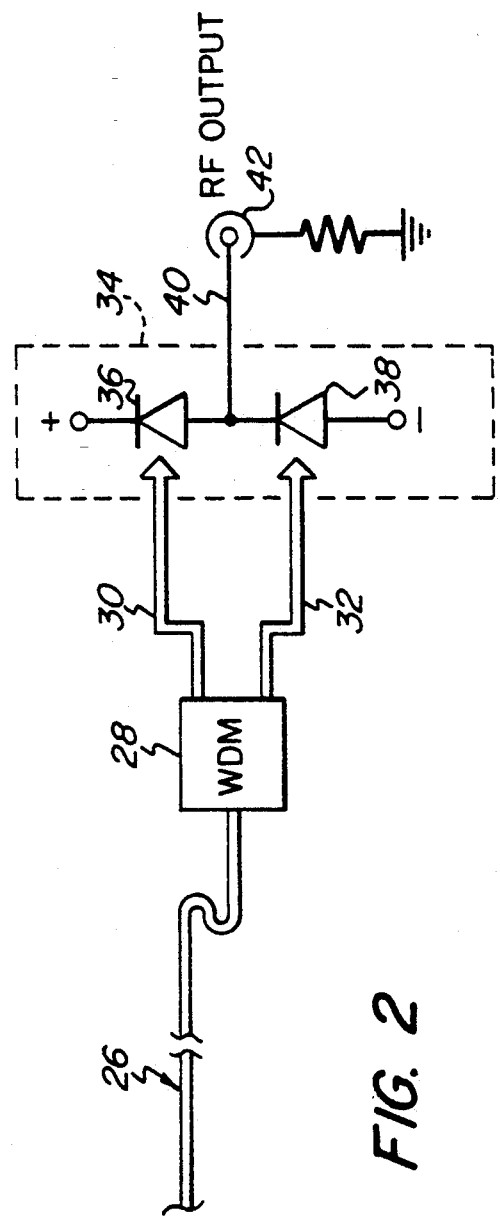
FIG. 2 is a block diagram illustrating one embodiment of receiver apparatus in accordance with the present invention, wherein optical signal paths are represented with double lines.

FIG. 2 illustrates one embodiment of a receiver for the multiplexed optical signal carried on optical fiber 26. The signal is input from the optical fiber to a wavelength division multiplexer 28 that is operated in the reverse direction, to provide a demultiplexing function. Thus, the modulated carrier from laser 20 containing the information provided by modulators 10 will be recovered on optical fiber 30, and the modulated carrier from laser 22 carrying the inverted information will be recovered on optical fiber 32. In order to maintain the balance of the recovered carriers, it is preferable that fibers 30 and 32 be bonded together at a closely controlled spacing that matches the spacing of photodetectors that are coupled to receive the recovered carriers.

In the embodiment illustrated in FIG. 2, the information signal from fiber 30 and inverted information signal from fiber 32 are input to optical detectors 36, 38, respectively, of a dual-detector balanced optical diode pair 34. Diode pair 34 can comprise, for example, a high speed monolithic device incorporating two photodiodes in a balanced mixer configuration, as disclosed in M. Makiuchi, et al, "High-Speed Monolithic GainAs Twin-pin Photodiode for Balanced Optical Coherent Receivers", *Electronics Letters, Aug.* 17, 1989, Vol. 25, No. 17, pp. 1144-1145.

The pair of differential photodiodes 36, 38 is advantageously fabricated on the same substrate, to provide superior common mode rejection of photodiode dark current, resulting in a significant reduction in output noise power. The fabrication of the photodiodes on a common substrate also provides superior high frequency common mode rejection of frequency components that would otherwise be generated if separate photodiodes were used for detection. The use of a well matched pair of photodiodes is cost effective in the present application, because only a single electronic device is necessary to recover the RF information signal. Diode pair 34 combines the information and inverted information from optical paths 30, 32, respectively, to recover the original RF input signal output from modulators 10 in the electrical domain with reduced distortion. The recovered RF signal is output via electrical path 40 to an RF output terminal 42, such as a conventional coaxial connector. By combining the modulated information with the modulated inverted information, even order harmonics introduced by the lasers or other components during the transmission of the signals are cancelled in diode pair 34 while the output power of the desired information signal is doubled.

Figure 3:
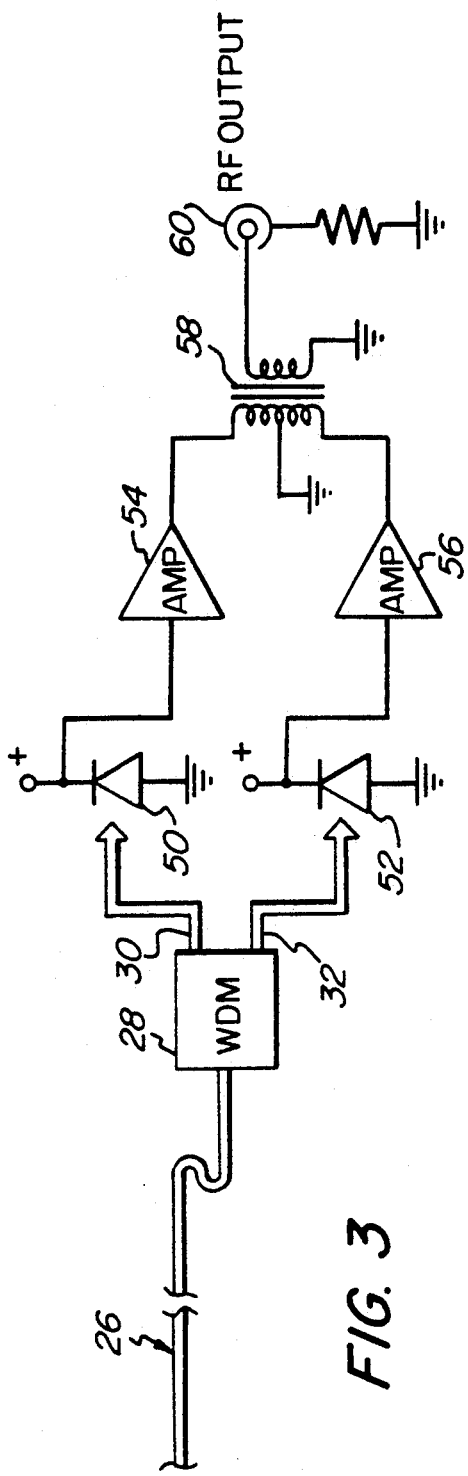
FIG. 3 is a block diagram illustrating an alternate embodiment of receiver apparatus in accordance with the present invention, in which optical signal paths are represented by double lines.

FIG. 3 illustrates an alternate embodiment for the receiver, in which separate photodetectors 50, 52 are provided to convert the recovered modulated optical carriers into corresponding electrical signals. The non-inverted information is amplified by a conventional RF amplifier 54 and input to the primary of a transformer 58. The inverted information is amplified by RF amplifier 56 for input to the primary of transformer 58. Transformer 58 combines the inverted and noninverted information signals in a conventional manner to output a combined signal, wherein even order harmonics are cancelled and the power of the desired information is doubled for output to an RF output terminal 60.

The combination of the inverted and noninverted information signals to cancel even order distortions and double the output power can be expressed mathematically. For example, laser 20 (FIG. 1) can be modulated with an RF input signal "$E_{IN}$". The resultant signal output by wavelength division multiplexer 28 on optical fiber 30 can be expressed as $E_{OUT1}$ wherein:

$$E_{OUT1} = K_0 + K_1 E_{IN} + K_2(E_{IN})^2 + K_3(E_{IN})^3 + \ldots$$

where $K_0$ is a DC component in the signal, $E_{IN}$ is the information signal to be recovered, $K_2(E_{IN})^2$ is a second order harmonic distortion component of the received signal, $K_3(E_{IN})^3$ is a third order distortion product, etc.

The RF input signal applied to laser 22 is 180° out of phase with $E_{IN}$, and can be expressed as "$-E_{IN}$". Therefore, the recovered signal $E_{OUT2}$ appearing on optical fiber 32 can be expressed as:

$$E_{OUT2} = -K_0 + K_1(-E_{IN}) + K_2(-E_{IN})^2 + K_3(-E_{IN})^3 + \ldots$$

As shown, in $E_{OUT2}$ all of the odd order products are negative and all of the even order products are positive. Therefore, when the magnitudes of $E_{OUT1}$ and $E_{OUT2}$ are equal, and they are 180° out of phase, DBOR 34 or transformer 58 will combine the signals, effectively subtracting $E_{OUT2}$ from $E_{OUT1}$, such that all even order components are cancelled and all odd order components (including the signal $E_{IN}$ to be retrieved) are doubled in power. This provides a 3 dB increase in the signal level of the RF signal to be recovered, while canceling the troublesome second order harmonic distortion components.

Figure 4:
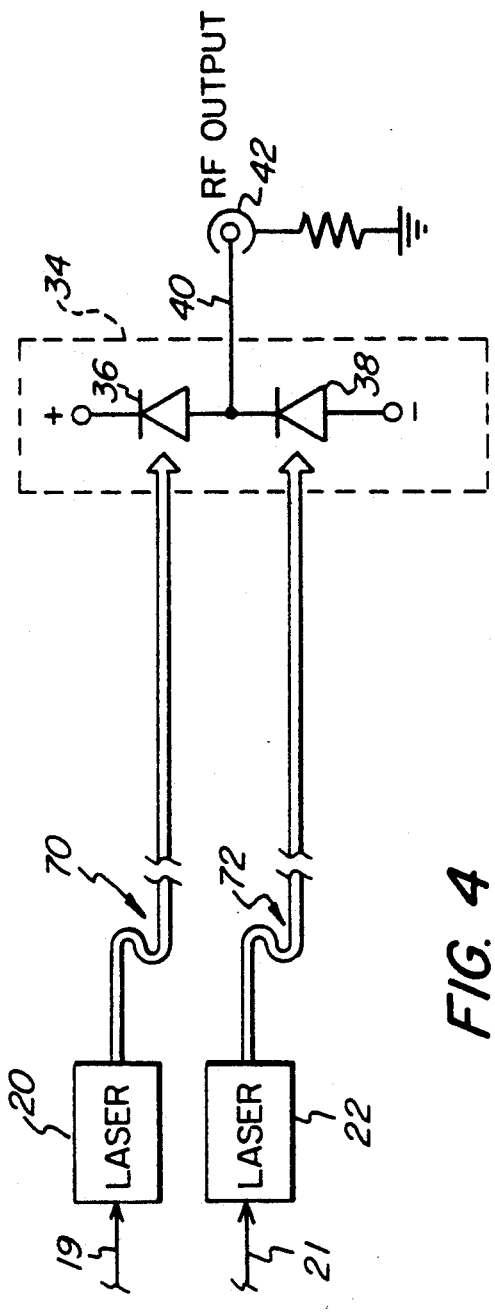
FIG. 4 is a block diagram illustrating an alternate embodiment of the present invention, wherein communication signals are transmitted via two parallel optical paths illustrated by double lines to a dual-detector balanced optical diode pair.

FIG. 4 illustrates an alternate embodiment for the communication system of the present invention. The transmitter portion of the apparatus is identical to that illustrated in FIG. 1 up through lasers 20, 22. The outputs of the lasers, however, are not multiplexed together. Instead, the separate outputs are communicated over separate optical fibers 70, 72, respectively, to diode pair 34. The signals are combined by diode pair 34 to recover the desired information while canceling even order harmonic distortion as described above. A disadvantage of the embodiment illustrated in FIG. 4 is that a parallel fiber path must be maintained all the way from the transmitter to the receiver.

It should now be appreciated that the present invention provides apparatus for communicating signals over an optical fiber with reduced distortion. A dual-detector balanced optical diode pair is advantageously used to simplify the recovery of an information signal while canceling even order harmonic distortions. Although the invention has been described in connection with several preferred embodiments, those skilled in the art will appreciate that numerous adaptations and modifications may be made thereto, without departing from the spirit and scope of the invention as set forth in the claims.

What is claimed is:

1. Apparatus for communicating analog signals over an optical fiber transmission path comprising:
    means for producing a first optical carrier;
    means coupled to receive an analog information signal carried on a first path for modulating said first optical carrier by said analog information signal;
    means for inverting the phase of said analog information signal for output on a second path;
    adjustment means provided in at least one of said first and second paths for providing the analog information signals in said paths at equal magnitudes and opposite phases with respect to each other;
    means for producing a second optical carrier;
    means coupled to receive the inverted analog information signal from said second path for modulating said second optical carrier by said inverted analog information signal; and
    means coupled to receive the modulated first and second optical carriers for multiplexing them into a single optical signal with reduced second order distortion for communication over an optical fiber path.

2. Apparatus in accordance with claim 1 further comprising:
    means coupled to a remote end of said optical fiber path for demultiplexing said optical signal to recover said information signal and inverted information signal; and
    means for combining the recovered signals to provide said information signal in the electrical domain with reduced distortion.

3. Apparatus in accordance with claim 2 wherein said combining means comprise a dual-detector balanced optical diode pair.

4. Apparatus in accordance with claim 2 wherein said combining means comprise:
    a first optical detector coupled to receive said recovered information signal and output a corresponding electrical signal;
    a second optical detector coupled to receive said recovered inverted information signal and output a corresponding electrical signal; and
    a transformer coupled to receive and combine the electrical outputs from said first and second optical detectors.

5. Apparatus in accordance with claim 2 wherein said multiplexer means comprise a wavelength division multiplexer and said demultiplexer means comprise a wavelength division demultiplexer.

6. Apparatus in accordance with claim 2 wherein:
    said first optical carrier producing means comprise a first laser;
    said second optical carrier producing means comprise a second laser; and
    the wavelength of said first laser is slightly spaced from the wavelength of said second laser to facilitate the multiplexing and demultiplexing of the modulated first and second optical carriers.

7. Apparatus in accordance with claim 6 wherein said first and second lasers are semiconductor lasers.

8. Apparatus in accordance with claim 6 wherein said multiplexer means comprise a wavelength division multiplexer and said demultiplexer means comprise a wavelength division demultiplexer.

9. Apparatus in accordance with claim I wherein said first and second optical carrier producing means comprise semiconductor lasers.

10. Apparatus in accordance with claim 1 wherein said multiplexing means comprise a wavelength division multiplexer.

11. Apparatus in accordance with claim 1 wherein said information signal comprises an analog AM signal.

12. Receiver apparatus for recovering an analog information signal from a first optical fiber carrying the information signal and a second optical fiber carrying said information signal with a 180° phase shift and at an equal magnitude with respect to the information signal carried on said first optical fiber, comprising:
    a dual-detector balanced optical diode pair;
    means for optically coupling said first optical fiber to a first detector of said optical diode pair; and
    means for optically coupling said second optical fiber to a second detector of said optical diode pair;
    wherein said optical receiver combines an analog information signal from the first optical fiber with the phase shifted information signal from the second optical fiber to cancel second order distortion products contained therein and output said information signal in the electrical domain with a reduced level of second order distortion.

13. Receiver apparatus in accordance with claim 12 further comprising:
    means for receiving an optical input signal containing said information signal multiplexed with said phase shifted information signal; and
    means for demultiplexing the received optical input signal to provide said information signal to said first optical fiber and to provide said phase shifted information signal to said second optical fiber.

14. Receiver apparatus in accordance with claim 13 wherein said demultiplexing means comprise an optical wavelength division demultiplexer.

15. Receiver apparatus for recovering an analog information signal from an optical input signal carried on an optical fiber, comprising:
    means coupled to an optical fiber for demultiplexing an optical input signal to recover an information signal and the inverse of said information signal at equal magnitudes and opposite phases; and means for combining the recovered information signal with the recovered inverted information signal to cancel second order distortion products contained therein and output said information signal in the electrical domain with a reduced level of second order distortion.

16. Receiver apparatus in accordance with claim 15 wherein said demultiplexing means comprise a wavelength division demultiplexer.

17. Receiver apparatus in accordance with claim 16 wherein said combining means comprise:
   a first optical detector coupled to receive said recovered information signal and output a corresponding electrical signal;
   a second optical detector coupled to receive said recovered inverted information signal and output a corresponding electrical signal; and
   a transformer coupled to receive and combine the electrical outputs from said first and second optical detectors.

* * * * *